United States Patent [19]

Chadwick et al.

[11] Patent Number: 4,628,518
[45] Date of Patent: Dec. 9, 1986

[54] RADIO RECEIVER

[75] Inventors: Peter E. Chadwick; Philip A. K. Moon, both of Swindon, England; Norman C. Thompson, Irvine, Calif.

[73] Assignee: Plessey Overseas Limited, Ilford, England

[21] Appl. No.: 532,653

[22] Filed: Sep. 15, 1983

Related U.S. Application Data

[63] Continuation-in-part of Ser. No. 294,794, Aug. 20, 1981, abandoned.

[51] Int. Cl.[4] .............................................. H04L 27/14
[52] U.S. Cl. ..................................... 375/88; 455/208; 329/104
[58] Field of Search .................. 329/50, 122, 123, 104; 455/192, 205, 208; 340/825.44, 825.48, 825.58, 825.71, 825.72; 375/80, 82, 88, 97

[56] References Cited

U.S. PATENT DOCUMENTS

| | | | |
|---|---|---|---|
| 2,507,735 | 5/1950 | Peterson | 455/192 |
| 2,932,730 | 4/1960 | Buff | 455/208 |
| 3,221,260 | 11/1965 | Henrion | 329/123 |
| 3,626,311 | 12/1971 | Kraybill | 455/208 |
| 4,103,244 | 7/1978 | Tan | 329/122 |
| 4,117,410 | 9/1978 | Bender | 329/122 |

FOREIGN PATENT DOCUMENTS 1172977 12/1969 United Kingdom .
2076238 11/1981 United Kingdom .

Primary Examiner—Benedict V. Safourek
Attorney, Agent, or Firm—Fleit, Jacobson, Cohn & Price

[57] ABSTRACT

A mixer receives a frequency shift keyed (FSK) radio signal having two transmission frequencies and mixes the radio signal with a first or a second local oscillator signal from a local oscillator to provide a mixed signal. The mixed signal lies within a high or low band of frequencies depending upon the frequency of the FSK signal and upon the local oscillator signal received by the mixer. A detector receives the mixed signal and detects in which band of frequencies the mixed signal lies, and generates a switching signal in dependence upon the band of frequencies in which the mixed signal lies. If the FSK signal changes to a different transmission frequency and this causes the mixed signal to lie in the low band of frequencies, then a switching signal is generated which switches the local oscillator such that the oscillator generates a different local oscillator signal which causes the mixed signal to shift to the high band of frequencies. In this way, the mixed signal is shifted back to the high band of frequencies whenever the detector detects that it has shifted to the low band of frequencies due to a change in the transmission frequency of the FSK signal. The switching signal therefore follows the transmitted binary bits on the FSK signal.

9 Claims, 5 Drawing Figures

RADIO RECEIVER

CROSS REFERENCE TO RELATED APPLICATION

This application is a continuation-in-part of Ser. No. 294,794, filed Aug. 20, 1981, now abandoned.

FIELD OF THE INVENTION

This invention relates to a radio receiver and in particular to a receiver for receiving frequency shift keyed (FSK) radio signals. In FSK systems binary bits are transmitted by transmitting logical one binary bits at one frequency and logical nought binary bits at another frequency. The binary bits are transmitted at a predetermined data rate.

On reception it is necessary to decide whether a received frequency represents a "one" or a "nought".

BACKGROUND OF THE INVENTION

1. Statement of prior art

A known receiver for achieving this uses two receiving channels. Each receiving channel includes a mixer and received signals are fed to the mixers in phase quadrature to one another. A local oscillator feeds a mixing signal to each mixer, the mixing signals being at a frequency which is midway between the frequencies transmitted for the logical "one" and "nought". Output signals from the two mixers are filtered, amplified and fed to a detector which provides output signals representative of the transmitted data. Such a two channel system has been described in U.K. Patent Specification No. 1172977.

The use of two separate receiving channels results in duplication of components and in a receiver which is complex and costly.

In United Kingdom Patent Application No. 2076238 there is described a radio receiver for receiving frequency shift keyed radio signals in which only a single receiving channel is used.

The invention of the above-mentioned application provides a radio receiver for receiving frequency shift keyed (FSK) radio signals in which differing binary bits are transmitted at respective ones of two frequencies; the receiver comprising a mixer for receiving the transmitted signals; a local oscillator arranged to feed a mixing signal to the mixer, a detector arranged to be fed with an I.F. signal from the mixer through a single receiving channel, a chopper arranged to apply a chopping signal to the local oscillator to change the frequency of the oscillator at a predetermined rate between the two values none of which lies midway between the two frequencies, the chopping signal being fed, in operation, to the detector in synchronism with that applied to the local oscillator whereby the detector is operative to detect the transmitted binary bits.

At any instant the mixer will provide either a relatively high frequency tone or a relatively low frequency tone in dependence upon the transmitted data at that instant and the frequency of the local oscillator. If the chopper output is such as to set the local oscillator to the higher of its two frequencies and the mixer provides an output which is also the relatively high frequency tone then the frequencies of the local oscillator and the received signal are at their furthest apart. If the mixer output is at the relatively low frequency whilst the local oscillator is at its high frequency then the transmitted frequency of the received signal and the local oscillator frequency are at their closest together.

The detector is operative to compare the chopper signal with the mixer output in logical fashion and provides an output signal which represents the transmitted data.

The above described single channel receiver provides an advantage in switching the frequency of the local oscillator in that a single channel is effectively time division multiplexed so that it operates as two channels. This provides a significant reduction in cost and complexity.

A problem arises with the above described single channel receiver when operation is required at higher data rates. It is essential for the receiver to operate satisfactorily that the mixer provides an output which is one or other of two distinct tones. As the data rate is increased a point is reached when the mixer output ceases to be a discrete tone and becomes a band of frequencies.

2. Summary Of The Invention

This invention seeks to provide a receiver for receiving FSK signals which utilises a single receiving channel and in which the above-mentioned disadvantage is mitigated.

According to one aspect of this invention there is provided a radio receiver for receiving frequency shift keyed (FSK) radio signals in which differing binary bits are transmitted at a different one of two transmission frequencies, the receiver comprising a mixer having a signal input for receiving the transmission frequencies, an input for a local oscillator and an output, a local oscillator having an output coupled with the local oscillator input of the mixer, which local oscillator has a switching signal input and is switchable between two frequencies neither of which is midway between the two transmission frequencies, a detector having an input coupled with the output of the mixer and a switching output coupled with the switching input of the local oscillator which detector is arranged to determine when the output from the mixer contains a frequency which is the difference between one of the two transmission frequencies and one of the local oscillator frequencies or the other of the transmission frequencies and the other of the local oscillator frequencies and to provide a switching signal for switching the local oscillator to its alternative frequency when such a frequency is detected, whereby the switching signal follows the transmitted binary bits and is coupled to a receiver output to provide a signal representative of the transmitted binary information.

According to another aspect of the invention there is provided a radio receiver for receiving frequency shift keyed (FSK) radio signals in which differing binary bits are transmitted at a different one of two transmission frequencies, the receiver comprising a mixer having a signal input for receiving the transmission frequencies, an input for a local oscillator and an output, a local oscillator having an output coupled with the local oscillator input of the mixer, which local oscillator has a switching signal input and is switchable between two frequencies neither of which is midway between the two transmission frequencies, a detector having an input coupled with the output of the mixer and a switching output coupled with the switching input of the local oscillator which detector is arranged to determine when the output from the mixer contains a frequency which is the difference between one of the two transmission frequencies and one of the local oscillator frequencies or the other of the transmission frequencies and the other of the local oscillator frequencies and to provide a switching signal for switching the local oscillator to its alternative frequency in the absence of detection of such a frequency, whereby in the presence of a signal, the switching signal follows the transmitted binary bits and is coupled to a receiver output to provide a signal representative of the transmitted binary information.

The receiver may include muting means responsive in the absence of a received signal to inhibit switching of the local oscillator frequency.

Alternatively, the switching signal may be coupled to the receiver output via switch means and the receiver may include a muting means responsive in the presence of a received signal to close the switch and to open the switch in the absence of a received signal.

In one advantageous form of the invention the oscillator frequencies are equidistantly displaced one each side of the arithmetic mean of the two transmission frequencies whereby said differences between one of the two transmission frequencies and one of the local oscillator frequencies and between the other of the transmission frequencies and the other of the local oscillator frequencies are equal.

In order to reduce the risk of adjacent channel interference the local oscillator frequencies may each be in a frequency band the extremities of which are defined by the two transmission frequencies.

The receiver may include a filter coupled between the output of the mixer and the input of the detector and having a pass band arranged to permit passage of the frequencies to be detected and to reject higher frequencies. The filter may be a low pass filter.

The detector may include a frequency detector circuit for sensing the frequency of the signals derived from the mixer and in one embodiment of the invention the frequency detector circuit is a digital frequency detector.

A flip-flop may be provided coupled to the frequency detector and operative to change state each time the frequency detector senses that the frequency of the signals derived from the mixer has changed from the predetermined value.

The flip-flop may be coupled to the local oscillator to effect switching of the local oscillator at each change of state of the flip-flop.

BRIEF DESCRIPTION OF THE DRAWINGS

In order that the invention and its various other preferred features may be understood more easily, some embodiments thereof will now be described, by way of example only, with reference to the drawings, in which.

Figure 1:
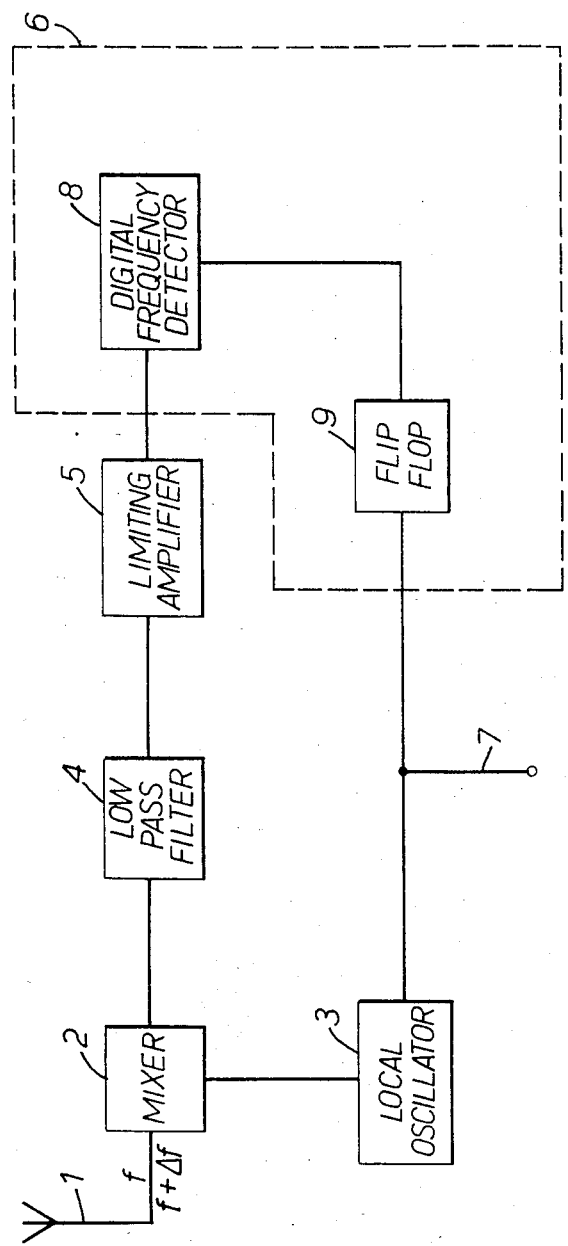
FIG. 1 is a block schematic diagram of a radio receiver constructed in accordance with the invention.
Figure 2:
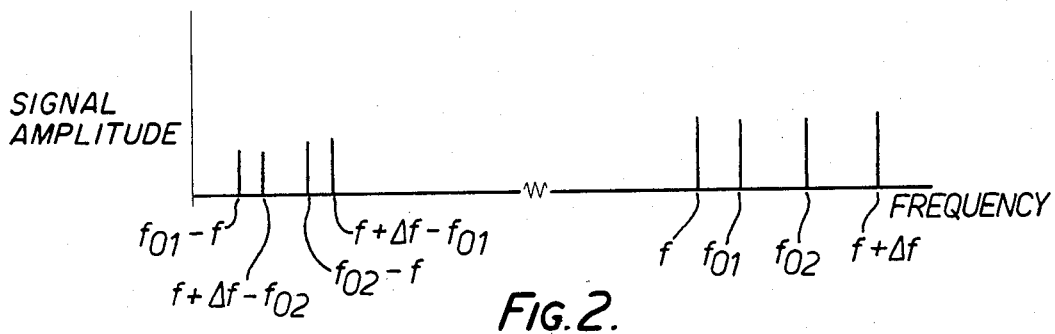
FIG. 2 shows the distribution of signal and oscillator frequencies of the arrangement of FIG. 1 on a frequency scale, together with the mixer output frequencies.

In the drawing of FIG. 1, frequency shift keyed radio signals $f$ and $f+\Delta f$, corresponding to digital modulation in dependence upon whether the transmitted data is a logical nought or logical one, are received at an aerial 1. These signals are fed to one input of a mixer 2, a second input of which receives a mixing signal from a local oscillator 3 which is switchable between two frequencies a relatively low frequency $f_{o1}$ and a relatively high frequency $f_{o2}$ each of which lies between the frequencies $f$ and $f+\Delta f$ but neither of which lies midway therebetween as can be seen from FIG. 2.

Output signals from the mixer 2 are fed via a low pass filter 4 and a limiting amplifier 5 to a detector 6 which is coupled both to the local oscillator 3, to effect switching thereof, and to an output terminal 7.

In the presence of a signal the output of the mixer will contain the frequencies $f_{o1}-f$, $f_{o2}-f$, $f+\Delta f-f_{o1}$ $f+\Delta f-f_{o2}$. If $f_{o1}$ and $f_{o2}$ are symmetrically disposed around the arithmetical mean of $f$ and $f+\Delta f$ then the frequencies $f_{o2}-f$ and $f+\Delta f-f_{o1}$ are equal as are the frequencies $f_{o1}-f$ and $f+\Delta f-f_{o2}$. The frequencies $f_{o2}+\Delta f+\Delta f-f_{o1}$ are higher frequencies and $f_{o1}-f$ and $f+\Delta f-f_{o2}$ are lower frequencies. These are distinguished as "high tones" and "low tones" respectively.

Figure 3:
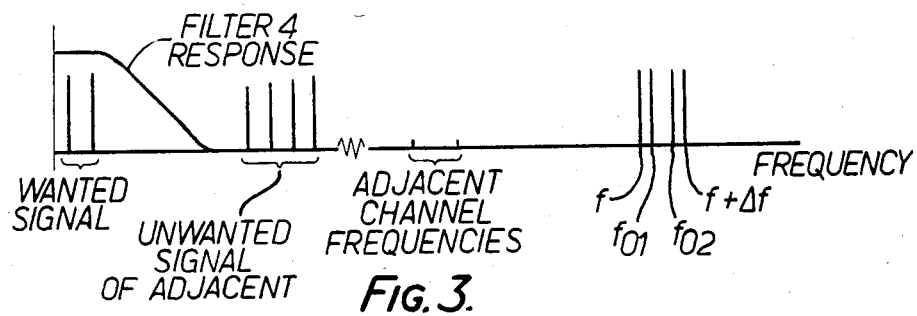
FIG. 3 shows the relative position of wanted frequencies and unwanted adjacent channel frequencies of the arrangement of FIG. 1 on a frequency scale.

The low pass filter is of a bandwidth sufficient to pass both low and high tones without distortion whilst signals in adjacent channels produce in the mixing process frequencies which are higher thanwhich are higher than the high tone which are rejected by the low pass filter 4. This is shown in FIG. 3 for a system in which $f_{o1}$ and $f_{o2}$ are symmetrically disposed around the arithmetic mean of $f$ and $f+\Delta f$.

The filter 4 provides the selectivity of the receiver and being a low pass filter is relatively simple to produce. It need not be a true low pass filter as the lowest frequency it requires to pass is $f_{o1}-f$. This means that capacitive coupling can be employed. In addition signal to noise ratio can be improved because of the reduction of noise bandwidth. The inclusion of what is effectively a band pass filter has the advantage of reducing the deterious effects of flicker(1/f) noise produced in the mixer.

There are many types of detector circuits 8 suitable for use in the detector 6 which will occur to those skilled in the art. For example a phase lock loop tone detector circuit arranged to lock to the or each high tone may be employed. A suitable device is the National Semiconductors LM567 tone detector integrated circuit. Other possibilities are linear detector circuits, pulse counting detector circuits which provide a voltage which varies in dependence upon the pulse count or even a frequency discriminator circuit such as the Foster Seeley or Travis. An even more convenient arrangement for realisation in integrated circuit form is a digital form of frequency detection circuit employing counters and timing to detect the difference between high and low tones.

The detector circuit may include a trigger circuit e.g. a flip-flop circuit 9 (as shown in FIG. 1) or a Schmitt Trigger to provide a switching signal for the local oscillator from an analogue signal.

The configuration of FIG. 1 may be arranged to operate as follows. If we assume that the incoming signal is, at a particular instant in time, at frequency $f$ and the local oscillator 3 at frequency $f_{o2}$ then a high tone results at the input to the detector. The output from the detector can be arranged to provide a voltage which does not cause the flip flop 9 to change its state and accordingly the local oscillator is maintained at frequency $f_{o2}$ when this high tone is present. If the incoming signal changes to frequency $f+\Delta f$, the output from the mixer becomes a low tone value. The frequency discriminator function of the detector is such that the detector output will change to a different voltage and this will cause the flip flop to change its state and cause the the oscillator to change to frequency $f_{o1}$. The output from the detector becomes a high tone again, the detector voltage changes back to its original voltage and the system will stay in this condition until a further change in input frequency occurs. Thus the switching output from the flip flop circuit 9 of the detector 6 will be stepped between two levels in sympathy with the frequency of the incoming signal and reproduces the binary information transmitted in the FSK mode. This information is coupled to an output 7.

The local oscillator 3 may be of a type that is constrained to operate only at one of two different frequencies by virtue of its design. One possibility of such an oscillator is a multivibrator with switched timing currents which are controllable by the output from the detector. Another possibility is the use of a trigger circuit e.g. a bistable circuit to provide predetermined bias levels for changing bias on a variable capacity diode in the oscillator circuit in dependence upon detection of a high tone or low tone.

If $f_{o1}$ and $f_{o2}$ are not symmetrically disposed about the arithmetic mean of $f$ and $f+\Delta f$, then the frequencies $f_{o2}-f$ and $f+\Delta f-f_{o1}$ are not equal. Similarly, frequencies $f_{o1}-f$ and $f+\Delta f-f_{o2}$ are not equal. (See FIG. 2). However provided that the frequency detector is such as to be able to discriminate between high tone and low tone values the system will function.

Although the previous description of operation has referred to maintaining a high tone value at the input to the detector it will be appreciated that the arrangement could be designed to maintain a low tone value. Such a configuration is intended to fall within the scope of this invention. Maintenance or detection of the high tone value is advantageous in some circumstances for example where we employ a tone detector. Such a detector requires a finite number of cycles for adequate detection and accordingly the higher tone will be responded to more quickly.

Although the preferred arrangement employs local oscillator frequencies which are located within a band the extremities of which are defined by the transmission frequencies, so as to provide good adjacent channel rejection, it will be appreciated that they could be located outside this band. In addition the local oscillator frequencies may be both higher than or both lower than this frequency band. Adjacent channel rejection may not be a problem in some applications e.g. paging if a limited number of channels are required.

Figure 4:
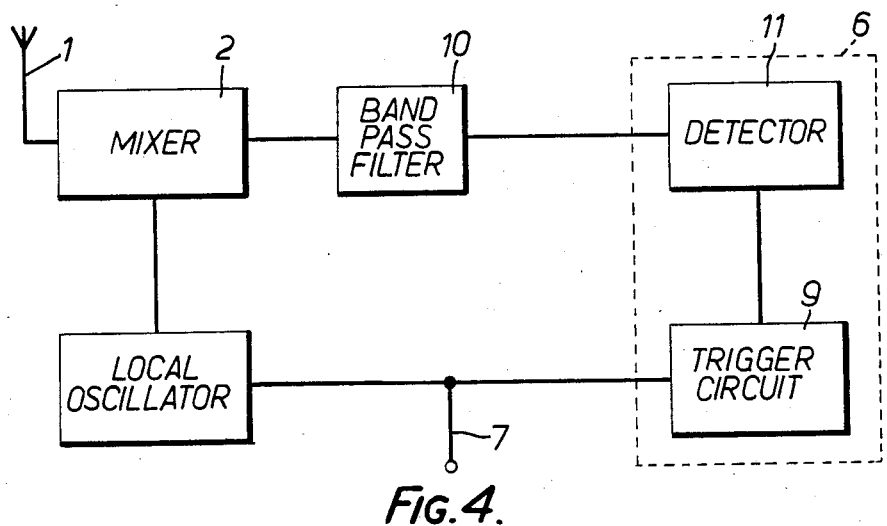
FIG. 4 is a block schematic diagram of an alternative configuration of a radio receiver constructed in accordance with the invention.

Another embodiment of the invention is shown in FIG. 4. This embodiment comprises an arrangement similar to FIG. 1 but in which the low pass filter is replaced by a band pass filter 10 which is arranged to pass the high tone or tones and reject the low tone or tones. A simple detector circuit 11 can now be employed in the detector 6 to provide an output voltage which switches a bistable trigger circuit 9 to its opposite state when a high tone is detected. The trigger circuit serves to switch the local oscillator 3 to its alternative frequency so restoring low tone output from the mixer.

An alternative arrangement which operates similarly employs a band pass or low pass filter to select only the low tone. Switching is in this case effected each time a low tone is detected. Both such arrangements are considered to fall within the scope of this invention.

Figure 5:
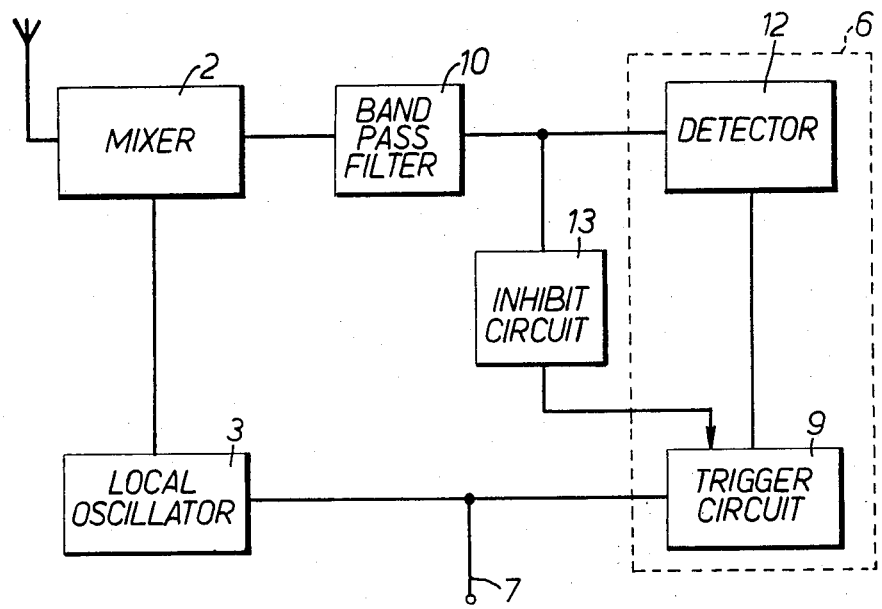
FIG. 5 is a block schematic diagram of yet another configuration of radio receiver constructed in accordance with the invention.

Yet another arrangement is shown in FIG. 5. This arrangement is similar to that of FIG. 4. However, the detector 12 is arranged to trigger the trigger circuit 9 when no high tone is detected. Accordingly the circuit strives to switch to a high tone condition. In the absence of a received signal the oscillator would continually switch between the two frequencies. However to avoid this an inhibit circuit 13 is provided which detects whether there is a signal output from the band pass filter and if there is not it provides an inhibit signal to the trigger circuit 9 to prevent switching. A suitable circuit is a simple level detector or rectifier.

It will be appreciated that although the arrangement of FIGS. 5 has been described as detecting the absence of a high tone, a similar arrangement could be employed to detect the absence of a low tone. Both such arrangements are considered to fall within the scope of this invention.

Some advantages that can be obtained by the arrangements described as compared with quadrature channel FSK receivers are:

1/ Only one filter and mixer are required.

2/ No requirement for quadrature local oscillator signals to drive two mixers.

3/ Power consumption can be reduced.

4/ Considerable simplification of circuitry and potential for reduction in space requirement particularly advantageous for fabrication in integrated circuits.

The system will find application in pocket radio paging applications, radio control and radio communications and is of special benefit where power consumption must be low.

We claim:

1. A radio receiver for receiving frequency shift keyed (FSK) radio signals in which differing binary bits are transmitted as a different one of two transmission frequencies, the receiver comprising:

a mixter means having a first input for receiving the FSK signal, a second input for receiving a first mixing signal and a second mixing signal having a different frequency from said first mixing signal, said mixer means having an output for providing a mixed signal at said output in dependence upon the received FSK signal and the received first or second mixing signal, said mixed signal having a frequency lying in a first band of frequencies or a second band of frequencies;

a local oscillator means for generating said first and second mixing signal, neither of which is midway between said two transmission frequencies, and having a mixing signal output coupled to said second input of the mixer means supplying said first and second mixing signals to said second input of said mixer means, and said local oscillator means having an input receiving a switching signal which is operative to switch the generation by said local oscillator means of said first and second mixing signals; and a detector means having an input, coupled to said output of said mixer means which receives said mixed signal, and having a switching output for providing said switching signal, said detector means detecting whether said mixed signal lies in said first or said second band of frequencies and generating said switching signal in dependence upon a transition between the two bands of frequencies such that if said mixed signal lies in a predetermined one of said first or said second band of frequencies, said switching signal switches said local oscillator means thereby causing said miced signal to shift to the other one of said first or second band of frequencies.

2. A radio receiver according to claim 1, wherein said switching signal is coupled to an output of the receiver to provide a signal representative of the transmitted binary bits.

3. A radio receiver according to claim 2, wherein said first band of frequencies is lower than said second band of frequencies and said predetermined one of said first or said second band of frequencies is said first band of frequencies.

4. A radio receiver according to claim 1, wherein said detector means includes means for continually producing said switching signal thereby causing said local oscillator to continually switch between said first and said second mixing signals dependent upon the absence of detection of said mixed signal due to non-receipt by the radio receiver of any frequency shift keyed (FSK) signal.

5. A radio receiver according to claim 4, including an inhibit circuit means coupled to said means for continually producing for detecting the absence of said mixed signal due to non-receipt by the radio receiver of any FSK signal and for inhibiting the production of said switching signal and hence switching of the local oscillator in response to detecting the absence of the mixed signal.

6. A radio receiver according to claim 5, wherein said detector means and said means for continually producing is a trigger circuit means for generating said switching signal, and said inhibit circuit is operative to disable said trigger circuit in the absence of said mixed signal and is operative to enable said trigger circuit in the presence of said mixed signal.

7. A radio receiver according to claim 1, wherein a filter is coupled between the output of said mixer means and the input of said detector means, said filter having a pass-band characteristic which permits passage of the frequencies to be detected and to reject higher frequencies.

8. A radio receiver according to claim 6, wherein said detector means includes a digital frequency detector for detecting whether said mixed signal lies in said first or second band of frequencies.

9. A radio receiver according to claim 8, wherein said trigger circuit includes a flip-flop which is operative to change state each time said digital frequency detector senses that said mixed signal lines in said predetermined one of said first or second band of frequencies, thereby generating said switching signal.

* * * * *